United States Patent [19]

Albert et al.

[11] Patent Number: 4,917,989

[45] Date of Patent: Apr. 17, 1990

[54] OPTICAL RECORDING MEDIUM WHICH HAS A REFLECTOR LAYER CONTAINING A SILICON-PHTHALOCYANINE DERIVATIVE

[75] Inventors: Bernhard Albert, Maxdorf; Peter Hauser, Limburgerhof; Michael Acker, Heppenheim; Wolfgang Schrott, Ludwigshafen; Gerhard Wagenblast, Frankenthal, all of Fed. Rep. of Germany

[73] Assignee: BASF Aktiengesellschaft, Ludwigshafen, Fed. Rep. of Germany

[21] Appl. No.: 194,891

[22] Filed: May 17, 1988

[30] Foreign Application Priority Data

May 19, 1987 [DE] Fed. Rep. of Germany ....... 3716734

[51] Int. Cl.$^4$ .................. G03C 5/16; G03C 1/72; G11B 7/24; B41M 5/26
[52] U.S. Cl. .................................. 430/270; 430/272; 430/495; 430/945; 346/135.1
[58] Field of Search ............... 430/270, 495, 945, 272; 346/135.1

[56] References Cited

U.S. PATENT DOCUMENTS

| | | |
|---|---|---|
| 3,658,822 | 4/1972 | Fauran et al. . |
| 3,971,793 | 7/1976 | Fauran et al. . |
| 4,079,895 | 3/1978 | deFenffe . |
| 4,230,939 | 10/1980 | de Bont et al. ............. 235/488 |
| 4,320,489 | 3/1982 | Crandall et al. . |
| 4,458,004 | 7/1984 | Tanikawa . |
| 4,504,548 | 3/1985 | Esho et al. . |
| 4,529,688 | 7/1985 | Law et al. ............. 430/494 |
| 4,631,328 | 12/1986 | Ringsdorf et al. . |
| 4,650,742 | 3/1987 | Goto et al. . |
| 4,675,423 | 6/1987 | Schrott et al. . |
| 4,702,945 | 10/1987 | Etzbach et al. . |
| 4,714,667 | 12/1987 | Sato et al. ............. 430/270 |
| 4,719,170 | 1/1988 | Schrott et al. . |
| 4,719,613 | 1/1988 | Hirose et al. ............. 369/109 |
| 4,725,525 | 2/1988 | Kenney et al. ............. 430/270 |
| 4,766,054 | 8/1988 | Hirose et al. ............. 430/270 |

FOREIGN PATENT DOCUMENTS

| | | |
|---|---|---|
| 0097929 | 9/1973 | European Pat. Off. . |
| 0090282 | 4/1978 | European Pat. Off. . |
| 0084729 | 6/1981 | European Pat. Off. . |
| 0171045 | 10/1986 | European Pat. Off. . |
| 1933178 | 3/1973 | Fed. Rep. of Germany . |
| 2730593 | 7/1978 | Fed. Rep. of Germany . |
| 3505750 | 2/1979 | Fed. Rep. of Germany . |
| 3505751 | 3/1979 | Fed. Rep. of Germany . |
| 2405278 | 11/1980 | Fed. Rep. of Germany . |
| 3507379 | 3/1981 | Fed. Rep. of Germany . |
| 3413940 | 3/1987 | Fed. Rep. of Germany . |
| 2387226 | 8/1971 | France . |
| 2387227 | 7/1975 | France . |
| 2447378 | 2/1979 | France . |
| 36490 | 3/1983 | Japan . |
| 011385 | 3/1985 | Japan . |
| 118492 | 11/1986 | Japan . |

OTHER PUBLICATIONS

*J. AM Chem. Soc.,* vol. 105, p. 1539 (1983), "Cofacial Assembly of Partially Oxidized Metallomacrocycles as an Approach to Controlling . . . ".
*Angewandte Chemie,* vol. 78, p. 937, (1966).
*Inorganic Chemistry,* vol. 5, No. 11, p. 1979, Nov. 1966, "The Synthesis and Physical Properties of Some Organo- and Organosiloxysilicon Phthalocyanines".

*Primary Examiner*—Paul R. Michl
*Assistant Examiner*—Mark R. Buscher
*Attorney, Agent, or Firm*—Oblon, Spivak, McClelland, Maier & Neustadt

[57] ABSTRACT

An optical recording medium contains a transparent base, a dye-containing layer which is sensitive to laser light and a reflector layer which contains a silicon-phthalocyanine derivative of the formula

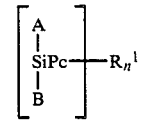

where $R^1$ is hydrogen, alkyl, alkoxy, halogen or trialkylsilyl, n is 1, 2, 3 or 4 and A and B are identical or different and independently of one another are each alkyl, halogen or unsubstituted or substituted alkoxy or trialkylsilyloxy.

10 Claims, No Drawings

OPTICAL RECORDING MEDIUM WHICH HAS A REFLECTOR LAYER CONTAINING A SILICON-PHTHALOCYANINE DERIVATIVE

The present invention relates to a novel optical recording medium containing a dye-containing layer which is sensitive to laser light and a reflector layer which contains a silicon-phthalocyanine derivative.

Recording materials which undergo a localized change of state when exposed to radiation of high energy density, for example laser light, are known. Such a thermally initiated change of state, e.g. vaporization, change in flow behavior or fading, is associated with a change in the optical properties, for example in the absorption, as a result of the change of the absorption maximum or of the extinction, and this change can be utilized for information or data recording.

The known information recording materials consist, for example, of a transparent base on which thin layers of organic compounds, for example IR dyes, are applied. In many cases, they additionally have a metallic reflector layer. The thin layers are produced, for example, by vapor deposition under reduced pressure or by spin coating.

For example, U.S. Pat. No. 4,079,895 discloses a recording medium which has a layer of a light-reflecting material (aluminum or gold), the said layer being covered with a light-absorbing layer which contains fluorescein.

In systems of this type, the high thermal conductivity of the metallic reflector layer is disadvantageous. Moreover, there is a danger of corrosion in the case of many inorganic materials.

On exposure through the transparent base, marking (change of state) generally occurs as a result of blister formation, which may have an adverse effect on the mechanical stability of the reflector layer.

However, monolayer systems having highly reflecting dye layers which do not require a metallic reflector must contain no binder at all or only a small amount of binder in addition to the dye, since otherwise their reflection behavior is unsatisfactory.

On the other hand, in the case of certain dye classes, there may be a danger of crystallization of the recording layer if the binder content is too low. This makes the said layer useless.

It is an object of the present invention to provide an optical recording medium having a reflector layer and a dye layer which may or may not contain a binder, the recording medium possessing high basic reflectivity and a long shelf life and having sensitive recording characteristics.

We have found that this object is achieved by a recording medium containing a transparent base, a dye-containing layer which is sensitive to laser light and a reflector layer which contains a silicon-phthalocyanine derivative of the formula I

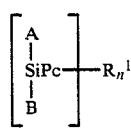
(I)

where $R^1$ is bonded to the phthalocyanine radical and is hydrogen, $C_1$-$C_{12}$-alkyl, $C_1$-$C_{12}$-alkoxy, halogen or a radical

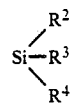

in which $R^2$, $R^3$ and $R^4$ are identical or different and independently of one another are each $C_1$-$C_5$-alkyl, n is 1, 2, 3 or 4 and A and B are identical or different and independently of one another are each $C_1$-$C_{12}$-alkyl which may be interrupted by one or more oxygen atoms or $C_1$-$C_4$-alkylimino groups and/or substituted by a 5-membered or 6-membered saturated heterocyclic radical, or is a radical

where $R^2$, $R^3$ and $R^4$ each have the abovementioned meanings.

All alkyl radicals occurring in the abovementioned formula I may be either straight-chain or branched.

Where $R^5$ is $C_1$-$C_{12}$-alkyl which is substituted by a 5-membered or 6-membered saturated heterocyclic ring, examples of suitable substituents of this type are pyrrolidino, piperidino, morpholino, piperazino or N-($C_1C_4$-alkyl)-piperazino, such as N-methyl- or N-ethyl-piperazino.

$R^1$, $R^2$, $R^3$, $R^4$, $R^5$, A and B in formula I are each, for example, methyl, ethyl, propyl, isopropyl, butyl, isobutyl, sec-butyl, tert-butyl, pentyl, isopentyl, sec-pentyl or tert-pentyl.

$R^1$, $R^5$, A and B in formula I are each furthermore, for example, hexyl, 2-methylpentyl, heptyl, octyl, 2-ethylhexyl, isooctyl, nonyl, isononyl, decyl, isodecyl, undecyl or dodecyl (the names isooctyl, isononyl and isodecyl are trivial names and are derived from the alcohols obtained in the oxo synthesis; cf. Ulmanns Enzyklopadie der technischen Chemie, 4th Edition, Volume 7, pages 215-217, and Volume 11, pages 435 and 436).

$R^1$, A and B in formula I are each furthermore, for example, fluorine, chlorine, bromine, methoxy, ethoxy, propoxy, isopropoxy, butoxy, isobutoxy, sec-butoxy, pentyloxy, isopentyloxy, sec-pentyloxy, hexyloxy, 2-methylpentyloxy, heptyloxy, octyloxy, 2-ethylhexyloxy, isooctyloxy, nonyloxy, isononyloxy, decyloxy, isodecyloxy, undecyloxy or dodecyloxy.

A and B in formula I are each furthermore, for example, 2-methoxyethoxy, 2-ethoxyethoxy, 2- or 3-ethoxypropoxy, 3,6-dioxaheptyloxy, 3,6-dioxaoctyloxy, 3,6,9-trioxadecyloxy, 2-dimethylaminoethoxy, 2-diethylaminoethoxy, 2-dipropylaminoethoxy, 2-diisopropylaminoethoxy, 2-dibutylaminoethoxy, 5-dimethylamino-3-oxapentyloxy, 2-dimethylaminopropoxy, 3-dimethylaminopropoxy, 3-dimethylaminoprop-2-yloxy, 4-dimethylaminobutoxy, 3-dimethylamino-2,2-dimethylpropoxy, 6-dimethylaminohexyloxy, 2-pyrrolidinoethoxy, 2-piperidinoethoxy, 2-morpholinoethoxy, 2-piperazinoethoxy, 2-(N-methylpiperadino)-ethoxy or 3-(N-ethylpiperidino)-propoxy.

$R^1$ and $R^5$ in formula I are each furthermore, for example, trimethylsilyl, triethylsilyl, tripropylsilyl, tributylsilyl, dimethylethylsilyl or methyldiethylsilyl.

Preferred optical recording media are those which contain a phthalocyanine derivative of the formula I where $R^1$ is hydrogen, $C_2$–$C_6$-alkyl, $C_1$–$C_8$-alkoxy, fluorine, chlorine or trimethylsilyl, n is 4 and A and B independently of one another are each $C_1$–$C_8$-alkyl, fluorine, chlorine or a radical $OR^5$, in which $R^5$ is $C_1$–$C_8$-alkyl which may be interrupted by one or more oxygen atoms or $C_1$–$C_4$-alkylimino groups and/or substituted by a 5-membered or 6-membered saturated heterocyclic radical.

Where $R^5$ is $C_1$–$C_8$-alkyl which is interrupted by one or more oxygen atoms or $C_1$–$C_4$-alkylimino groups, preferred components are those in which this radical $R^5$ is interrupted by one or two oxygen atoms or $C_1$–$C_4$-alkylimino groups.

Some of the silicon-phthalocyanine derivatives of the formula I are known and are described in, for example, F. H. Moser and A. L. Thomas, The Phthalocyanines, CRC Press, Boca Rota, Fla. 1983; those which are unknown can be prepared by a conventional method, as described therein.

The starting materials used are the corresponding phthalo derivatives. Examples are the dinitriles (II) and diiminoisoindolines (III), where $R^1$ and n have the abovementioned meanings.

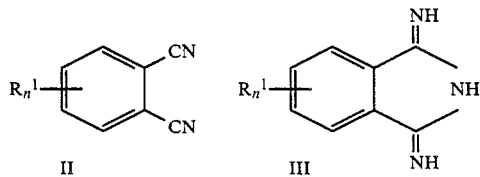

Dichlorosilicon-phthalocyanine can be prepared, for example, by the method disclosed in J. Am. Chem. Soc. 105 (1983), 1539. Substituted derivatives can be prepared in a similar manner. For working up these derivatives, chloroform may be replaced by methanol.

Exchange of chlorine for alkoxy radicals at the central silicon atom is effected, for example, in pyridine in the presence of excess triethylamine. The reactant used is the relevant alcohol.

Fluorine is incorporated using anhydrous hydrogen fluoride, starting from the corresponding hydroxy derivatives. Compared with the method disclosed in Inorganic Chemistry 5 (1966), 1979, which employs hydrofluoric acid, the reaction with anhydrous hydrogen fluoride takes place more smoothly.

Asymmetrically substituted phthalocyanine derivatives can be obtained, for example, according to the following reaction scheme:

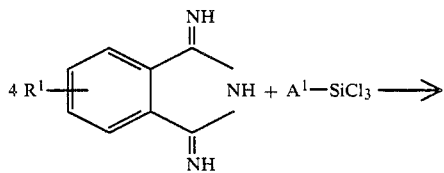

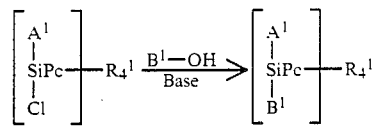

In the above scheme, $R^1$ has the abovementioned meanings, $A^1$ and $B^1$ are each, for example, $C_1$–$C_{12}$-alkyl. The reaction is carried out by the method disclosed in Inorganic Chemistry 5 (1966), 1979.

The structure of the recording media is known per se.

Examples of suitable transparent bases are glass sheets or disks or plastic sheets or disks, in particular sheets or disks of polymethyl methacrylate, polystyrene, polystyrene copolymers, polyvinyl chloride, polymethylpentene or polycarbonate, which may possess tracks.

The base may be in the form of a belt, a square or rectangular sheet or a circular disk, the known disks which have a diameter of 10 or 13 cm and are conventionally used for laser-optical recording materials being preferred. It is also possible to use bases already containing grooves in order to permit track guidance and rapid data access in this manner.

Suitable dyes which are present in the layer which is sensitive to laser light are all compounds which have sufficient absorption at the wavelength of the laser light used (about 700-900 nm). In the case of the semiconductor laser, these are, for example, phthalocyanines (EP-A No. 84 729 and U.S. Pat. No. 4,458,004), dithiolene complexes (DE-A No. 3 505 751 and U.S. Pat. No. 4,320,489), chromium, cobalt or manganese complexes with dihydroxyazo ligands (JP-A No. 11385/1985), methine dyes (U.S. Pat. No. 4,460,665), indigo derivatives, anthraquinones (JP-A No. 118 492/1986), naphthoquinones (EP-A No. 97929) and triquinonecyclopropanes (DE-A No. 3 507 379).

The layer which is sensitive to laser light may contain, as further components, polymers which are compatible with the dyes. Such polymers are generally referred to as binders. Examples of suitable binders are polystyrenes, polyesters, polyacrylates, polymethacrylates, polycarbonates, polyamines, polyvinyl alcohols, polyvinyl chlorides, copolymers of vinyl chloride and vinyl acetate, and polymers or copolymers containing liquid crystalline side groups, according to EP-A Nos. 90 282 or 171045.

Preferred optical recording media are those in which the dye layer additionally contains a binder. The dye content in the layer is from 35 to 85% by weight, based on the weight of the layer. The remaining 65-15% by weight are accounted for by the binder and any further additives.

Examples of further suitable additives which may be present in the films are low molecular weight liquid crystalline compounds.

The individual layers (dye layer and reflector layer) may be applied to the base in any order. In a preferred optical recording medium, the reflector layer containing a silicon-phthalocyanine derivative of the formula I is located between the base and the dye-containing layer.

In the production of the novel optical recording medium, the following procedure is advantageously adopted: the silicon-phthalocyanine derivatives of the formula I are applied by vapor deposition to the base under reduced pressure (from $10^{-7}$ to $10^{-4}$ bar) at from 100° to 400° C. However, it is also possible to apply a solution of the silicon-phthalocyanines I in a suitable solvent by spin coating. The dye layer is then applied on top of this reflector layer.

The dyes can be applied to the reflector layer by vapor deposition under reduced pressure. Preferably, however, a solution of the relevant dyes, which preferably also contains a binder and may contain other assistants, such as antioxidants, which increase the stability of the dyes, is applied directly to the reflector layer by spin-coating. It is however, also possible to apply the dye by knife-coating.

Because of the high chemical resistance of the reflector layer present on the base, it is possible to use any solvent in which the dyes, binders and, where relevant, the further assistants are readily soluble and which have evaporation behavior which is optimum for the production of solvents. Examples of solvents are bromoform, ethanol, methyl ethyl ketone, toluene, 1,1,1- and 1,1,2-trichloroethane and xylene. The reflector layer acts as a protective layer for the base. This applies in particular to silicon-phthalocyanine layers applied by vapor deposition.

In the case of silicon-phthalocyanine layers applied by spin-coating, a solvent in which the siliconphthalocyanine derivative is insoluble is selected for applying the dye-containing absorber layer.

For example, the reflector layer is applied to the base by spin-coating with polycarbonate-compatible alcohols. Thereafter, the absorber layer, dissolved in toluene, is applied by spin-coating.

The novel optical recording media have many advantageous properties. For example, they have a substantially higher basic reflectivity (from 20 to 50%). This in turn has an advantageous effect on the focusing of the laser beam. It also permits better track guidance in the case of bases having tracks. Furthermore, the contrast and the signal/noise ratio are also decisively improved as a result. In addition, more weakly absorbing IR dyes can be used in this manner, which is not readily feasible in the case of the known optical recording media.

Furthermore, in the novel optical recording media, the effect of morphological changes in the dye-containing layer, both in unrecorded and in recorded systems, has a much less adverse effect than in the case of certain prior art systems, in which there may be a danger of crystallization of the recording layer if the binder content is too low.

As a result of the sandwich-like structure (base/silicon-phthalocyanine reflector/dye layer), the layer which is sensitive to laser light is protected in an advantageous manner from visible light and UV radiation, which has a very advantageous effect on the light stability of the novel systems.

Finally, in the novel optical recording medium, the stored information can be read after recording even when the IR dye in the absorber layer fades, which may occur, for example, as a result of continuous reading.

The advantages of the production of the novel systems, arising from the high chemical resistance of the chemical layer, have already been pointed out above.

The Examples which follow illustrate the invention.

(A) Preparation of the silicon-phthalocyanines

The following preparation examples are typical for the preparation of all silicon-phthalocyanines of the formula I.

(a) Synthesis of

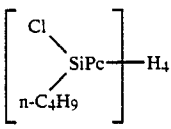

20 g of n-butyltrichlorosilane and 11 g of 1,3-diiminoisoindoline in 150 ml of quinoline were heated for 2 hours at 190° C. After the mixture had cooled, 200 ml of methanol were added and the product was filtered off under suction and washed with methanol.

(b) Synthesis of

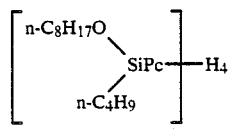

5 g of the compound described under (a) in 100 ml of pyridine were initially taken. Thereafter, 500 ml of triethylamine and 3 ml of n-octanol were added and the mixture was stirred for 6 hours at 70° C., cooled and then poured onto water, and the product was filtered off under suction and washed with water. The crude product was chromatographed with toluene/methylene chloride (1:1 (v/v)) over neutral alumina.

(c) Synthesis of

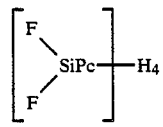

5 g of dihydroxysilicon-phthalocyanine were powdered very finely and then stirred with 60 ml of anhydrous hydrogen chloride for 6 hours at room temperature, all volatile components distilling off over a descending condenser. Pure difluorosilicon-phthalocyanine remained. (B) Production of the optical recording medium A rotating disk (diameter 12 cm) of polymethyl methacrylate was slowly coated with one of the siliconphthalocyanine derivatives P1-P3 (cf. Table 3) by vapor deposition at a speed of 200 rpm under reduced pressure ($10^{-5}$ bar) from a heatable tantalum boat, until a layer thickness of about 50 nm was reached. In the case of the silicon-phthalocyanines P4-P9, the reflector layer was applied by spin-coating. The reflectivity at a wavelength of 800 nm was Re1.

0.5 g of dye F and 0.5 g of binder B in 20 ml of solvent L were stirred overnight at room temperature and then forced through a frit (P4) under superatmospheric pressure. The resulting solution was then applied by means of a syringe to the silicon-phthalocyanine layer of the disk described above, which was rotated. The solution was spun off for 25 sec at a speed of 2000 rpm and then spun dry for 35 sec at a speed of 5000 rpm. The resulting layer was homogeneous, pinhole-free and highly reflective. Through the substrate, a reflectivity Re2 was observed.

Table 1 below gives the silicon-phthalocyanine derivative P of the reflector layer, the measured reflectivities Re1 and Re2 and the solvent L, binder B, dye F and dye:binder weight ratio.

Table 2 shows the chemical structural formulae of the particular dyes F used and Table 3 shows those of the particular silicon-phthalocyanines used.

For the binders, the following abbreviations are applicable:
PS: polystyrene
MMA/MAS: methyl methacrylate/methacrylic acid
PMMA: polymethyl methacrylate
SAN: styrene/acrylonitrile copolymer

TABLE 1

| Example No. | P | Re1 [%] | F | B | F:B | L | Re2 [%] |
|---|---|---|---|---|---|---|---|
| 1 | P1 | 50 | F1 | PS | 50:50 | toluene | 23 |
| 2 | P1 | 50 | F2 | MMA/MAS | 50:50 | ethyl acetate | 27 |
| 3 | P1 | 50 | F6 | PMMA | 50:50 | chloroform | 30 |
| 4 | P1 | 50 | F7 | SAN | 50:50 | 1,1,2-trichloroethane | 25 |
| 5 | P1 | 50 | F9 | MMA/MAS | 50:50 | 1,1,2-trichloroethane | 26 |
| 6 | P3 | 48 | F3 | PS | 50:50 | toluene | 23 |
| 7 | P2 | 45 | F7 | SAN | 50:50 | 1,1,2-trichloroethane | 27 |
| 8 | P3 | 48 | F4 | PS | 50:50 | toluene | 23 |
| 9 | P2 | 45 | F5 | PMMA | 50:50 | 1,1,2-trichloroethane | 28 |
| 10 | P4 | 35 | F2 | MMA/MAS | 50:50 | ethyl acetate | 20 |
| 11 | P5 | 32 | F8 | MMA/MAS | 50:50 | methylglycol | 20 |
| 12 | P6 | 34 | F8 | MMA/MAS | 50:50 | methylglycol | 22 |
| 13 | P7 | 30 | F1 | PS | 50:50 | toluene | 18 |
| 14 | P8 | 34 | F9 | MMA/MAS | 50:50 | methylglycol | 22 |
| 15 | P9 | 32 | F8 | MMA/MAS | 50:50 | methylglycol | 21 |
| 16 | P7 | 30 | F7 | SAN | 50:50 | 1,1,2-trichloroethane | 20 |
| 17 | P7 | 30 | F2 | PS | 50:50 | toluene | 22 |

TABLE 2

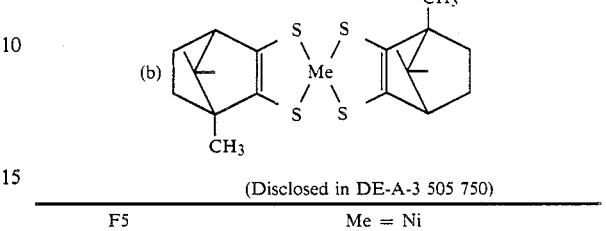

(Disclosed in DE-A-3 505 751)

| | X | X' | Me |
|---|---|---|---|
| F1 | F | n-$C_8H_{17}$ | Pt |
| F2 | F | n-$C_5H_{11}$ | Pt |
| F3 | F | n-$C_8H_{17}$ | Ni |
| F4 | F | n-$C_5H_{11}$ | Ni |

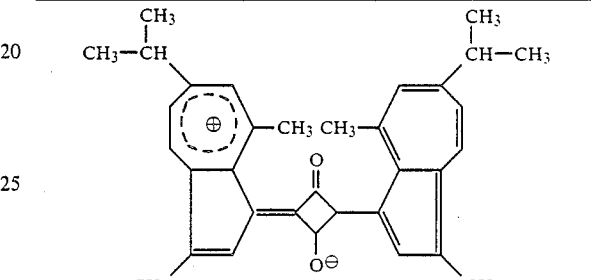

(Disclosed in DE-A-3 505 750)

| | | |
|---|---|---|
| F5 | Me = Ni | |
| F6 | Me = Pt | |

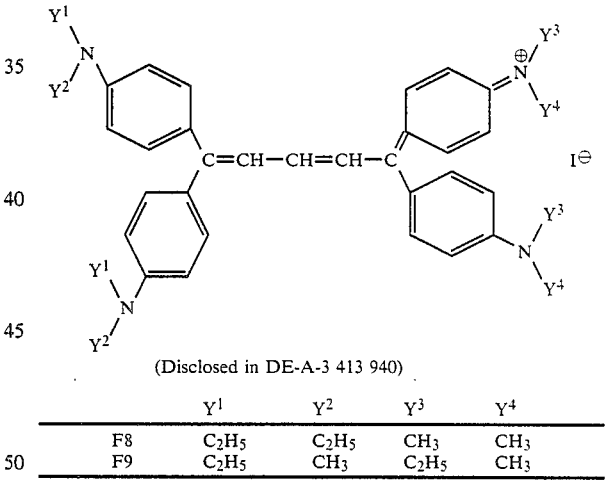

(Disclosed in Angew. Chem. 78 (1966), 937)

| | $Y^1$ | $Y^2$ | $Y^3$ | $Y^4$ |
|---|---|---|---|---|
| F8 | $C_2H_5$ | $C_2H_5$ | $CH_3$ | $CH_3$ |
| F9 | $C_2H_5$ | $CH_3$ | $C_2H_5$ | $CH_3$ |

(Disclosed in DE-A-3 413 940)

TABLE 3

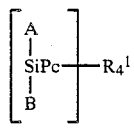

| | $R^1$ | A | B |
|---|---|---|---|
| P1 | H | Cl | Cl |
| P2 | H | F | F |
| P3 | H | $OCH_3$ | $OCH_3$ |
| P4 | 4-t-Butyl | O-n-$C_8H_{17}$ | n-$C_4H_9$ |
| P5 | 4-Si$(CH_3)_3$ | $OC_{12}H_{25}$ | n-$C_4H_9$ |
| P6 | 4-C$(CH_3)_2$—$CH_2$—C$(CH_3)_3$ | 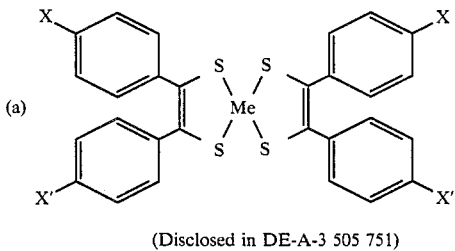 | |

TABLE 3-continued $$\left[\begin{array}{c} A \\ | \\ SiPc \\ | \\ B \end{array}\right] - R_4^1$$

| | $R^1$ | A | B |
|---|---|---|---|
| P7 | H | O(CH$_2$)$_3$—N(CH$_3$)$_2$ | O(CH$_2$)$_3$—N(CH$_3$)$_2$ |
| P8 | H | OC$_2$H$_4$—O—CH$_2$—C(CH$_3$) | OC$_2$H$_4$—O—CH$_2$—C(CH$_3$)$_3$ |
| P9 | 4-t-Butyl | OC$_2$H$_4$—O—CH$_2$—CH(C$_4$H$_9$)(C$_2$H$_5$) | OC$_2$H$_4$—O—CH$_2$—CH(C$_4$H$_9$)(C$_2$H$_5$) |

(C) In a drive, a semiconductor laser (wavelength 836 nm) could readily be focused on the abovementioned layers through the transparent base.

The layers could readily be marked and could be read with an excellent signal/noise ratio.

We claim:

1. An optical recording medium capable of having information recorded thereon by a laser beam in the form of optically detectable marks, which comprises a transparent base, a dye-containing layer which is sensitive to laser light and a reflector layer which contains a silicon-phthalocyanine derivative of the formula:

$$\left[\begin{array}{c} A \\ | \\ SiPc \\ | \\ B \end{array}\right] - R_n^1$$

wherein $R^1$ is bonded to the phthalocyanine radical and is hydrogen, $C_1$–$C_{12}$ alkyl, $C_1$–$C_{12}$-alkoxy, halogen or a radical of the formula:

wherein $R^2$, $R^3$ and $R^4$ are identical or different and independently of one another are each $C_1$–$C_5$-alkyl, n is 1, 2, 3 or 4 and A and B are identical or different and independently of one another are each $C_1$–$C_{12}$-alkyl, halogen or a radical of the formula —OR$^5$, in which R$^5$ is $C_1$–$C_{12}$-alkyl which is optionally interrupted by one or more oxygen atoms or $C_1$–$C_4$-alkylimino groups or substituted by a 5-membered or 6-membered saturated heterocyclic radical or a combination thereof, or is a radical of the formula:

wherein $R^2$, $R^3$ and $R^4$ are as defined above.

2. The optical recording medium as claimed in claim 1, wherein $R^1$ is hydrogen, $C_2$–$C_8$-alkoxy, fluoride, chlorine or trimethylsilyl, n is 4 and A and B independently of one another are each $C_1$–$C_8$-alkyl, fluorine, chlorine or a radical of the formula OR$^5$, in which R$^5$ is $C_1$–$C_8$-alkyl which is optionally interrupted by one or more oxygen atoms or $C_1$–$C_4$-alkylimino groups or substituted by a 5-membered or 6-membered saturated heterocyclic radical or a combination thereof.

3. The optical recording medium as claimed in claim 1, wherein the reflector layer containing a silicon-phthalocyanine derivative of the formula I is located between the transparent base and the dye-containing layer which is sensitive to laser light.

4. The optical recording medium as claimed in claim 1, wherein the dye-containing layer which is sensitive to laser light additionally contains a binder.

5. The optical recording medium as claimed in claim 1, wherein said saturated heterocyclic radical is selected from the group consisting of pyrrolidino, piperidino, morpholino, piperazino and N-($C_1$-$C_4$-alkyl)piperazino.

6. The optical recording medium as claimed in claim 1, wherein A and B are each selected from the group consisting of 2-methoxyethoxy, 2-ethoxyethoxy, 2- or 3-ethoxypropoxy, 3,6-dioxaheptyloxy, 3,6-dioxaoctyloxy, 3,6,9-trioxadecyloxy, 2-dimethylaminoethoxy, 2-diethylaminoethoxy, 2-dipropylaminoethoxy, 2-diisopropylaminoethoxy, 2-dibutylaminoethoxy, 5-dimethylamino-3-oxapentyloxy, 2-dimethylaminopropoxy, 3-dimethylaminopropoxy, 3-dimethylamino-prop-2-yloxy, 4-dimethylaminobutoxy, 3-dimethylamino-2,2-dimethylpropoxy, 6-dimethylaminohexyloxy, 2-pyrrolidinoethoxy, 2-piperidinoethoxy, 2-morpholinoethoxy, 2-piperazinoethoxy, 2-(N-methylpiperidino)-ethoxy and 3-(N-ethylpiperidino)-propoxy.

7. The optical recording medium as claimed in claim 1, wherein $R^1$ is hydrogen, $C_2$–$C_6$-alkyl, $C_1$–$C_8$-alkoxy, fluorine, chlorine or trimethylsilyl; n is 4; and A and B are each $C_1$–$C_8$-alkyl, fluorine, chlorine or said radical —OR$^5$, wherein R$^5$ is $C_1$–$C_8$-alkyl, which is optionally interrupted by one or more oxygen atoms or $C_1$–$C_4$-alkylimino groups or substituted by said heterocyclic radical.

8. The optical recording medium as claimed in claim 1, wherein said transparent base is a disk or sheet made of glass or plastic.

9. The optical recording medium as claimed in claim 1, wherein said dye-containing layer contains a dye selected from the group consisting of phthalocyanines, dithiolene complexes, chromium, cobalt or manganese complexes with dihydroxyazo ligands, methines, indigos, anthraquinones, naphthoquinones and triquinone-cyclopropanes.

10. The optical recording medium as claimed in claim 4, wherein said binder is present in the amount of 35 to 85% by weight, based on the weight of the dye-containing layer.

* * * * *